Jan. 21, 1964  J. W. ISSOTT  3,118,328
APPARATUS FOR PRODUCING LONGITUDINAL, INTERNAL, AND
INTEGRAL FINS IN TUBING
Filed March 15, 1962  7 Sheets-Sheet 2
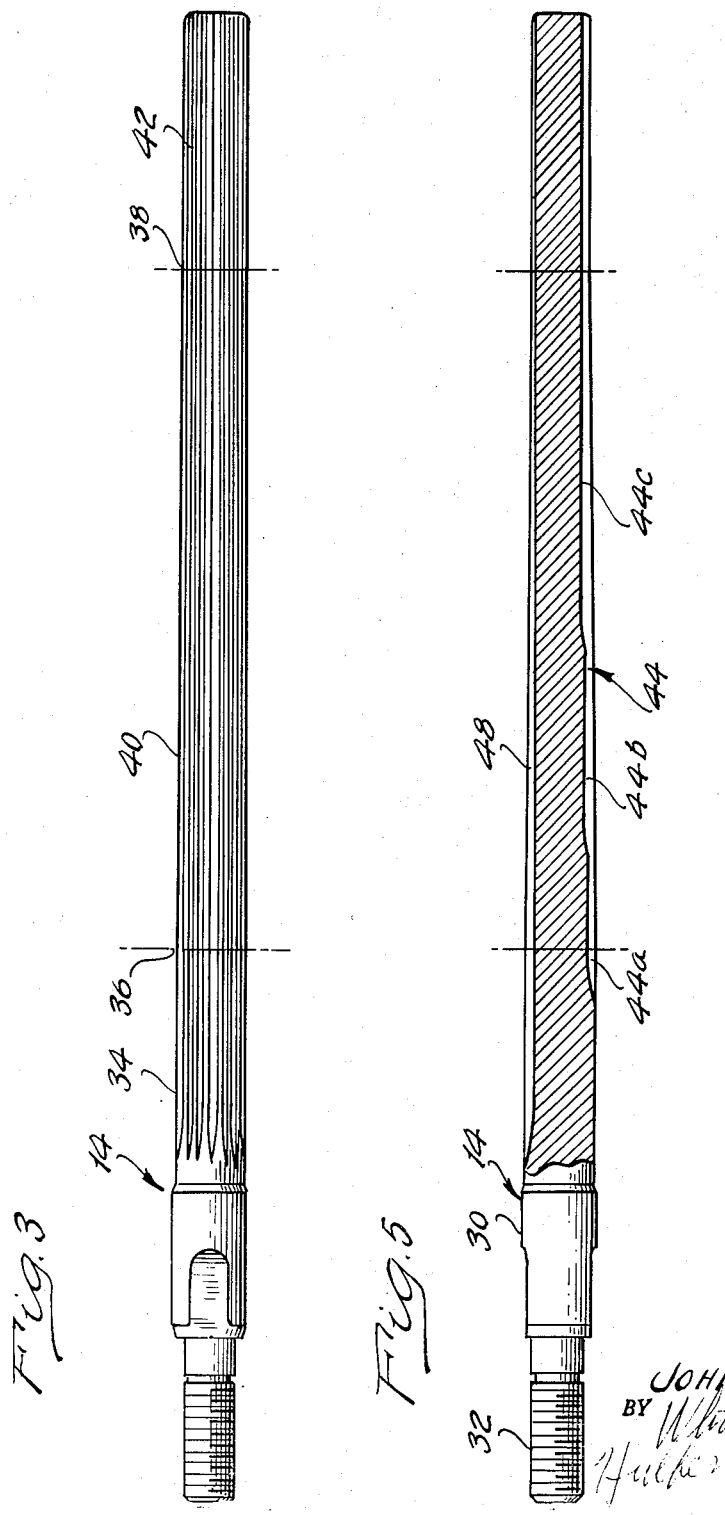
INVENTOR.
JOHN W. ISSOTT
BY
ATTORNEYS.

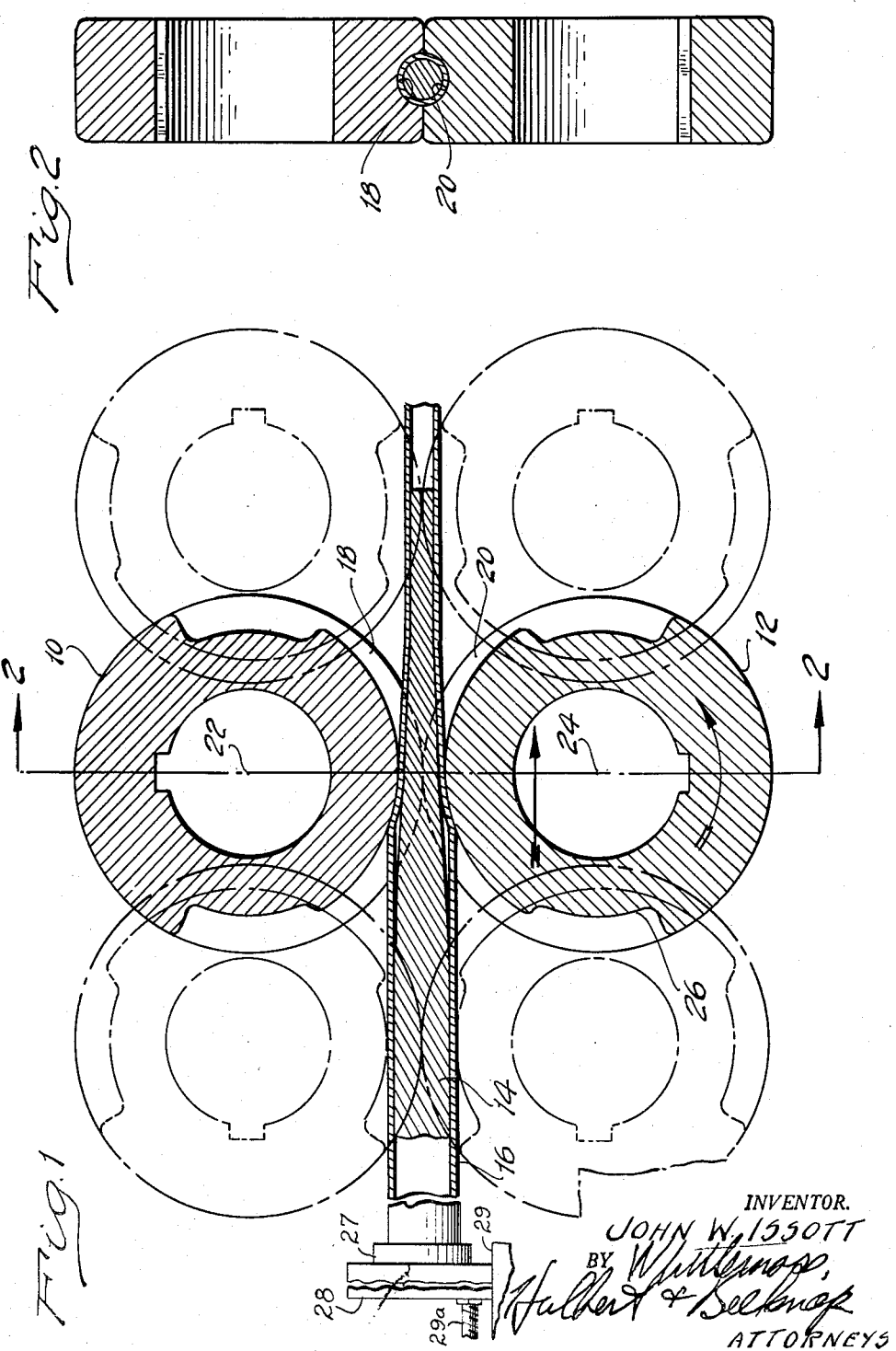

INVENTOR.
JOHN W. ISSOTT

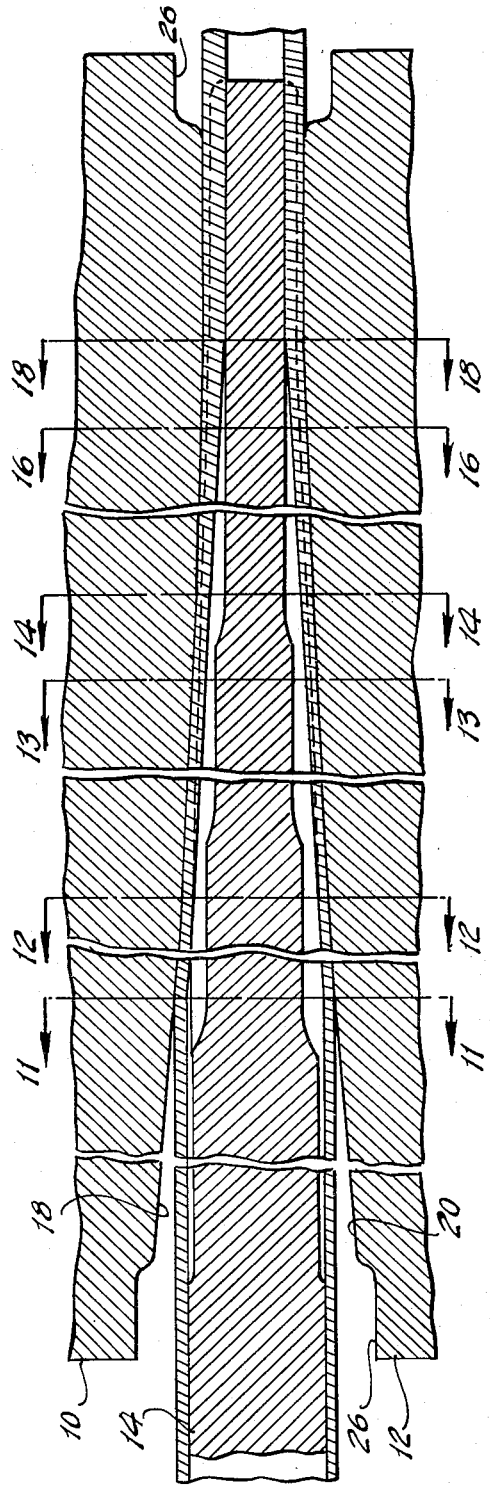

Jan. 21, 1964 J. W. ISSOTT 3,118,328
APPARATUS FOR PRODUCING LONGITUDINAL, INTERNAL, AND
INTEGRAL FINS IN TUBING
Filed March 15, 1962 7 Sheets-Sheet 5

INVENTOR.
JOHN W. ISSOTT
BY
ATTORNEYS

Jan. 21, 1964  J. W. ISSOTT  3,118,328
APPARATUS FOR PRODUCING LONGITUDINAL, INTERNAL, AND
INTEGRAL FINS IN TUBING
Filed March 15, 1962  7 Sheets-Sheet 6

INVENTOR.
JOHN W. ISSOTT
BY
ATTORNEYS.

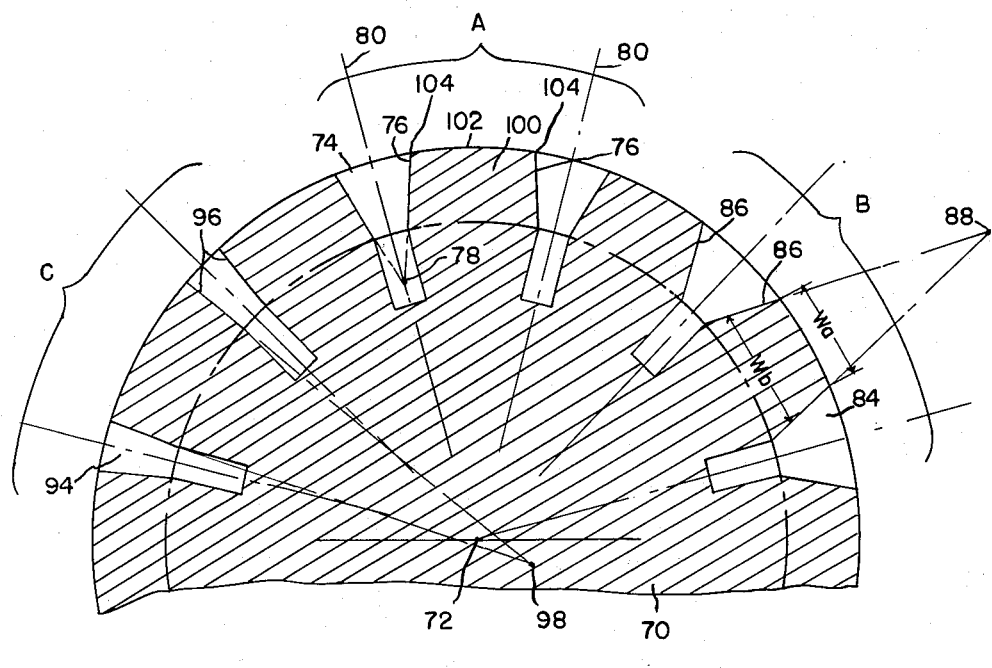

United States Patent Office 3,118,328
Patented Jan. 21, 1964

3,118,328
APPARATUS FOR PRODUCING LONGITUDINAL, INTERNAL, AND INTEGRAL FINS IN TUBING
John W. Issott, Dearborn, Mich., assignor to Calumet & Hecla, Inc., City of Allen Park, Mich., a corporation of Michigan
Filed Mar. 15, 1962, Ser. No. 180,943
8 Claims. (Cl. 80—11)

The present invention relates to apparatus for producing longitudinal, internal, and integral fins in tubing.

The present application is a continuation-in-part of my prior copending application Serial No. 850,474, filed November 2, 1959, and now abandoned.

It is an object of the present invention to provide a novel apparatus for forming longitudinally extending internal integral fins in metal tubing.

More specifically, it is an object of the present invention to provide apparatus for forming longitudinally extending internal integral fins including a tube reducer for advancing the tube in a predetermined manner over a specially formed mandrel.

It is a further object of the present invention to provide apparatus for forming internal longitudinally extending integral fins on tubing which comprises means for initially gathering a predetermined quantity of material at the inner portion of the tube and means for extruding this material progressively into fin form.

It is a further object of the present invention to provide a mandrel for use in tubes with a tube reducer comprising a pair of opposed peripherally grooved tapered rolls, the mandrel being provided with a tapered portion having longitudinally extending radial fin-forming slots or grooves therein, the slots or grooves adjacent the surface of the mandrel having outwardly inclined surface portions effective to gather and control the flow of material into the fin-forming slots or grooves.

Other objects and features of the invention will become apparent as the description proceeds, especially when taken in conjunction with the accompanying drawings, illustrating preferred embodiments of the invention, wherein:

FIGURE 1 is a diagrammatic view with parts in section showing a tube reducer and mandrel as employed in the present invention.

FIGURE 2 is a section on the line 2—2, FIGURE 1.

FIGURE 3 is an elevational view of a mandrel constructed in accordance with the present invention.

FIGURE 5 is a longitudinal sectional view through the mandrel showing at the top thereof the formation of the inclined wall material gathering channel, and at the bottom thereof the formation of the fin-forming slot or groove of stepped or progressive depth.

FIGURE 10 is an enlarged developed sectional view of the rolls and grooved mandrel indicating the progressive reduction in diameter of the tube and the progressive radial inward extrusion of the fins.

FIGURE 11 is an enlarged fragmentary sectional view through the mandrel, tube and roll on the line 11—11, FIGURE 10.

FIGURE 12 is a similar view taken on the line 12—12, FIGURE 10.

Figure 16:
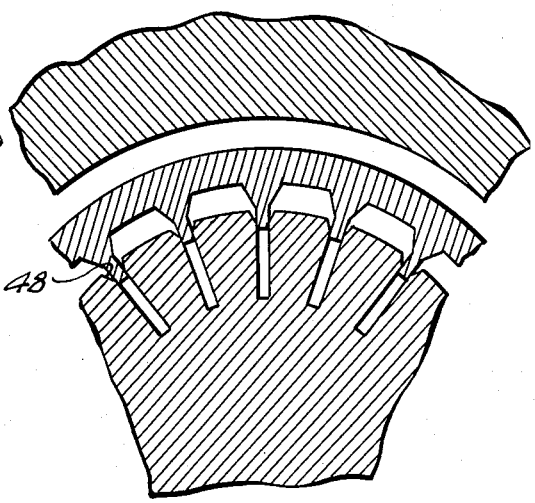

FIGURE 16 is a fragmentary enlarged sectional view on the section 16—16, FIGURE 10, showing the material as formed at section 14—14 advanced to the plane of section 16—16 while in the relief section of the roll.

Figure 17:
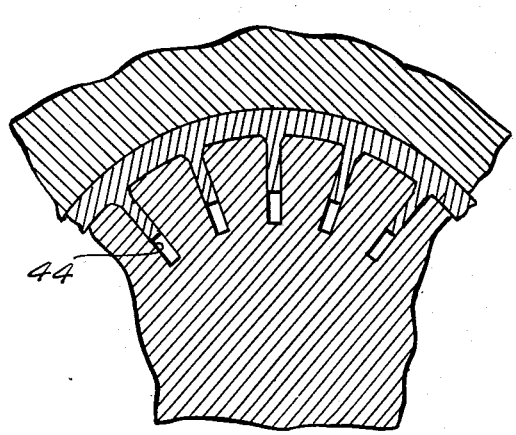

FIGURE 17 is a view similar to FIGURE 16 showing further extrusion of the fins at section 16—16 by displacement of metal by rolling.

Figure 18:
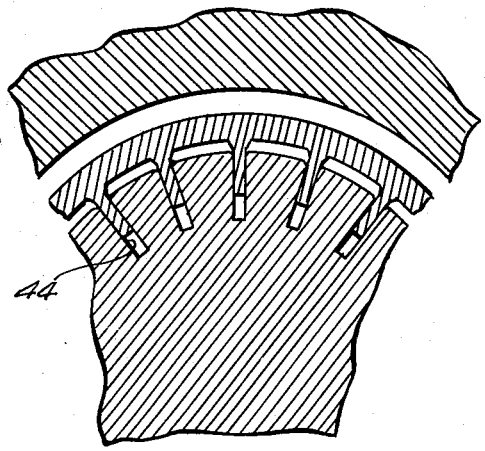

FIGURE 18 is a fragmentary enlarged sectional view on the line 18—18 showing the tube material as advanced to this position while in the relief section of the roll.

Figure 19:
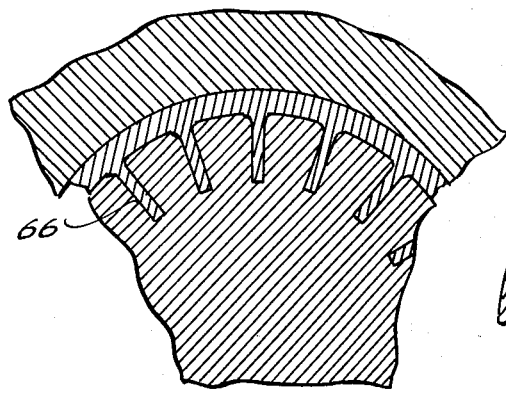

FIGURE 19 is a view similar to FIGURE 18 showing the further displacement of metal after rolling.

Figure 20:
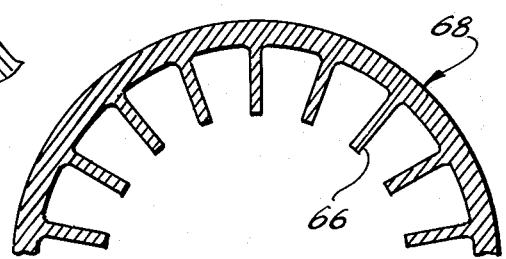

FIGURE 20 is a fragmentary enlarged section of the finished internally finned tubing.

FIGURE 21 is an enlarged fragmentary section of a mandrel illustrating a number of differently shaped material gathering channels.

Referring first to FIGURES 1 and 2 there is shown the association of a pair of rolls 10 and 12 and a mandrel 14 for the purpose of modifying a tube 16. The mandrel is tapered as indicated and the rolls 10 and 12 have spirally formed generally circumferentially extending semi-circular recesses 18 and 20.

The apparatus includes means for advancing the pair of rolls 10 and 12 axially of the mandrel while at the same time imparting a predetermined rotation thereof about their respective axes 22 and 24. The rotation imparted to the rolls 10 and 12 is in the direction which would result in rolling of the rolls on the tube but is at a somewhat different rate so that continuous slippage occurs between the surfaces of the concave grooves 18 and 20 and the adjacent portions of the tube 16.

Where the mandrel 14 is formed of smooth circular cross-section the tube reducer as described above has as its function the reduction in diameter of the tubing together with an accurate control of wall thickness and its operation accordingly results in controlled elongation of the tube.

As used in the practice of the present method, the mandrel is modified as will subsequently be pointed out.

In either case, the operation consists of relatively rapid back and forth traverse of a carriage or slide carrying the rolls 10 and 12, and means for effecting controlled rotation thereof. It will be observed that the rolls both include relief sections 26 which permit the rolls to be restored to the initial position in clearance with respect to the partially reduced tubing.

Following each working stroke of the rolls the mandrel is rotated substantially as for example approximately 60 degrees, and at the same time the tube is advanced over the mandrel by a predetermined increment as for example about 1/8 inch. Advance and rotation of the tube may be accomplished by a chuck 27 mounted for rotation in a head 28 which is movable axially of the mandrel on a support 29 by suitable feed means such for example as the feed screw indicated at 29a.

The present invention is concerned with the production of fins which are to be distinguished from splines. The distinction between fins and splines may be regarded as determined by the ratio of height to width or thickness of the fin. In the present case the internal formation is regarded as a fin since its height or radial dimension exceeds its width or thickness.

Figure 4:
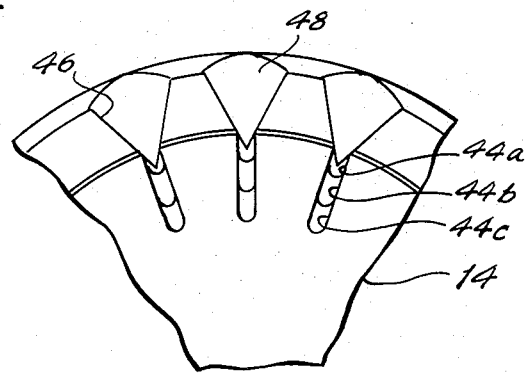
FIGURE 4 is a fragmentary enlarged end view of the mandrel shown in FIGURE 3.

Referring now to FIGURES 3–9 there is shown the detailed construction of the mandrel. As seen in these figures the mandrel comprises an elongated body formed of a hard metal having an enlarged head 30 of a size to pass within tubing to be reduced and finned. To the left of the head 30 there is provided a threaded section 32 for connection to suitable mandrel support means (not shown). To the right of the head 30 as seen in FIGURES 3 and 5, the mandrel includes a cylindrical portion 34 extending from the head to the line 36. Between the lines 36 and 38, which represent connections between cylindrical and tapered portions, or tapered portions of different degree of taper, the mandrel includes the portion 40 having a uniform taper. In a typical example the section 40 may be 8 inches long and taper from an outside diameter at the line 36 of approximately .835 inch to an outside diameter at the line 38 of approximately .677 inch. The trailing portion of the mandrel designated 42, may for example be 3 inches long and taper from a diameter of .677 to a diameter of .672. The mandrel portions 34, 40 and 42 are provided with continuous slots or grooves one of which is indicated generally at 44 at the bottom of FIGURE 5. The radially outward portions of the slots or grooves 44 have material gathering inclined side walls 46, as seen in FIGURE 4, forming material gathering channels 48 one of which is shown at the top of FIGURE 5, the inclination being shown greatly exaggerated for clarity.

Figure 6:
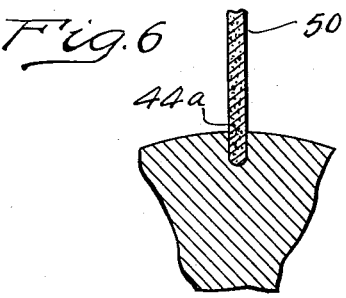
FIGURE 6 is a fragmentary sectional view showing the formation of the fin-forming slot or groove to minimum depth.
Figure 7:
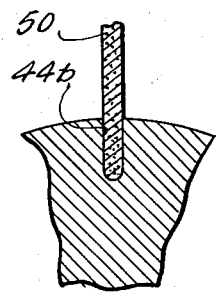
FIGURES 7 and 8 are views similar to FIGURE 6 showing the formation of the fin-forming groove or slot to successively greater depth.
Figure 8:
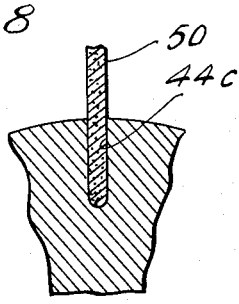

In forming the slots or grooves 44 and the channels 48 the operations are carried out as suggested in FIGURES 6–9. In FIGURE 6 there is shown the relatively shallow slot portion 44a formed by a grinding wheel 50 which is moved parallel to the axis of the mandrel 14 to form the shallow portion 44a of grooves or slots 44. As seen in FIGURE 7, the succeeding operation is carried out by feeding the wheel 50 to a relatively greater depth to form the intermediate depth portion 44b of the grooves or slots. As seen in FIGURE 8, the wheel 50 is finally fed to its full depth to form the relatively deepest portion 44c of the grooves or slots 44.

It is to be kept in mind that the grinding of these slot portions to depth is carried out by relative traverse between the wheel 50 and the mandrel in a direction parallel to the axis of the mandrel. It will also be recalled that the mandrel is tapered so that the actual depth of each separate portion 44a, 44b, and 44c of the slot 44 varies continuously.

Figure 9:
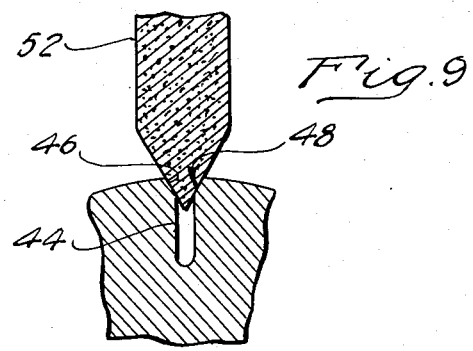
FIGURE 9 is an enlarged fragmentary sectional view showing the provision of the inclined wall material gathering channel of the mandrel.

Referring now to FIGURE 9 there is illustrated the final step in the production of the combined fin-forming groove or slot 44 and the material gathering channel 48. In this operation a different wheel 52 is employed having its periphery trimmed to have a relatively large included angle so as to form the inclined side walls 46 at the radially outer ends of the slots or grooves 44. As seen in FIGURE 9, the included angle between the side walls 46 of the channels is shown as 60 degrees. The selection of the proper included angle will be discussed subsequently. Formation of the inclined wall material gathering channel 48 is accomplished by a relative traverse between the grinding wheel 52 and the mandrel in a direction parallel to the axis of the mandrel. Accordingly, the depth of the inclined wall material gathering channel varies continuously throughout the tapered portion of the mandrel. Also, adjacent the left hand end of the mandrel as seen in FIGURE 5 for example, it will be appreciated that the transverse dimension of the inclined wall channel is a maximum.

Referring now to FIGURES 10–20 there is shown the coaction between the mandrel 14 and the rolls 10 and 12. In FIGURE 10 it will be appreciated that the rolls are shown in development, the relief sections 26 appearing at either end thereof and the spirally formed arcuate channels 18 and 20 being shown in development inclined to the axis of the mandrel 14.

Before referring to the progressive mandrel displacement illustrated in FIGURES 11–20, it may be stated in general that the operation of the tube reducer is to roll the material of the tube radially inwardly against a mandrel of smaller and inwardly tapering diameter so as to reduce both the internal and external diameter of the tube, to control the wall thickness of the tubing, and to produce predetermined elongation of the tubing. In addition, and as shown in the present invention, predetermined portions of the tubing adjacent its inner surface are initially set off and gathered together in material gathering channels having opposed inclined or inwardly tapered walls. This material is progressively squeezed radially inwardly toward the narrower portion of the channels and thereafter is extruded to the substantially parallel sided radially extending fin-forming grooves or slots 18. As shown at section 11 of FIGURE 10, and in FIGURE 11, the material of the tube 16 is engaged at its outer surface by one of the rolls as it passes in its rolling stroke thereover, but at this time the inner surface of the tube 16 is spaced outwardly from the inclined wall material gathering channels 48. When the material of the tube 16 has advanced to the section line 12, as best seen in FIGURE 12, passage of the roll along the outer surface of the tube 16 displaces the tube radially inwardly so that some metal is initially gathered in the material gathering channels 48, this material being indicated at 60. After each passage of the rolls 10 and 12, as previously described, the tube is advanced a short distance as for example ⅛ inch.

Figure 13:
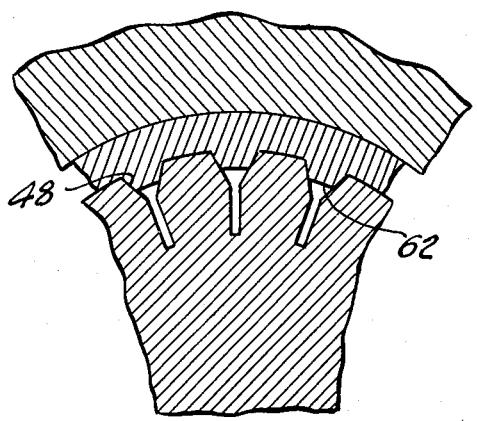
FIGURE 13 is a similar view taken on the line 13—13, FIGURE 10.

Eventually, the material of the tube reaches the condition illustrated in FIGURE 13, which is a fragmentary section on the line 13—13, FIGURE 10. In this figure it will be noted that due to the overall taper of the mandrel, the inclined wall material gathering channels 48 are of less height, the relatively wide outer portion thereof being eliminated. It will also be observed that there has been a further displacement and gathering of material into these channels, this material being indicated at 62.

Figure 14:
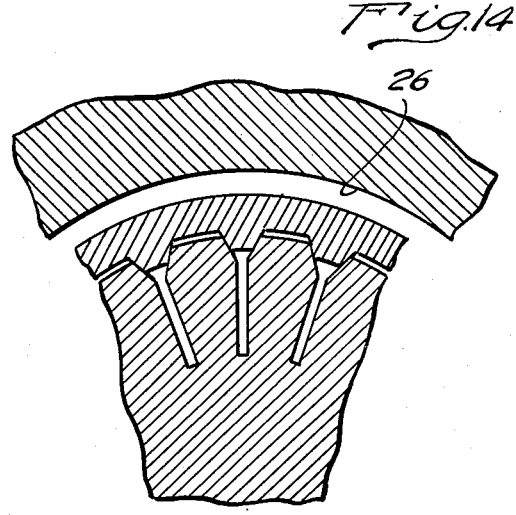
FIGURE 14 is a sectional view on the line 14—14, FIGURE 10 showing the tubing advanced to this position while in the relief section of the roll.

In FIGURE 14 there is illustrated the condition existing by advance of the material shown in FIGURE 13 to the next succeeding plane prior to rolling in this plane. In this figure it will be observed that the outside diameter of the tube is shown out of engagement with the roll, and the inside diameter out of contact with the outside diameter of the mandrel due to advance toward the small end of the mandrel.

Figure 15:
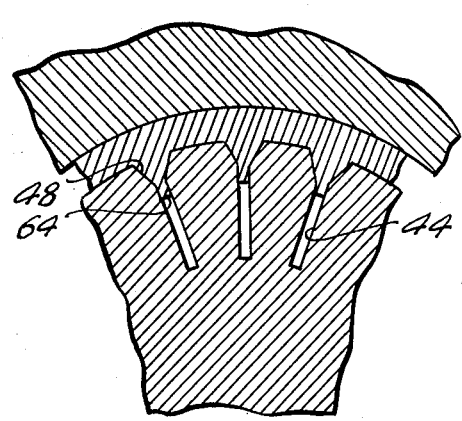
FIGURE 15 is a view similar to FIGURE 14 showing the displacement of metal at the plane 14—14 after the rolling operation.

Referring now to FIGURE 15 there is illustrated the condition of the material at the plane of FIGURE 14 during or after the passage of the rolls 10 and 12. It will be observed that the material gathered in the material gathering channel 48 has at this time been displaced radially inwardly to an extent where it completely fills the remaining portion of the channel and includes a relatively short portion illustrated at 64 which has been extruded into the fin-forming grooves or slots 44.

The operation continues as illustrated in FIGURES 16–19. FIGURE 16 illustrates the material as formed to the shape illustrated in FIGURE 15 after it has been advanced to the plane 16—16 of FIGURE 10. At this time it will be observed that the material gathering channels 48 have largely disappeared. The next passage of the rolls, as illustrated in FIGURE 17, thus extrudes additional material previously gathered by the channels 48 into the fin-forming slots or grooves 44. This operation is continued through one more illustrated step as shown in FIGURES 18 and 19, producing the inwardly directed fins 66.

FIGURE 20 illustrates a portion of the completed finned tube 68 which it will be observed has a wall thickness reduced substantially from its original thickness shown in FIGURE 11, and which further is provided with the radially inwardly extending fins 66. The fins as shown have a height approximately six times as great as their thickness.

While FIGURES 11–19 have illustrated conditions at selected planes, it is to be understood that this showing is largely explanatory since the progression of the tube between each successive passage of the rolls is only about ⅛ inch. Accordingly, while FIGURES 11–19 illustrate the general pattern of displacement of material, it will of course be understood that this displacement is by much smaller increments than is illustrated in the figures.

In general terms, the present operation involves the use of a material gathering channel having outwardly diverging side walls, the channel being in communication at the bottom with a fin receiving groove. Side walls of the groove are substantially parallel so that as the material gathered in the channel is forced downwardly therein, it is extruded into the fin receiving groove. The cross-sectional area of the channel diminishes from one end to the other. In the illustrated embodiment of the invention this reduction in cross-sectional area of the channel results from the fact that the mandrel is tapered and the material gathering channel extends in parallelism with the axis of the mandrel. The radial spacing of the channel is such that at the small end of the mandrel the cross-sectional area of the channel diminishes to a negligible value or disappears completely.

Instead of employing a tapered mandrel, similar results may be obtained by providing a material gathering channel having outwardly diverging inclined walls which is disposed at a small angle with respect to a mandrel of generally cylindrical non-tapering cross-section.

While the present disclosure is of a tube reducer in which the material deforming forces are applied by a pair of opposed circumferentially and spirally grooved rolls, the pressure may be applied to the outer surface of the tube by other means such for example as by swaging.

In the figures used to illustrate the foregoing description, the included angle between opposite walls of the material gathering channel has been exaggerated for clarity. As a matter of fact, the included angle between the side walls of the material gathering channel is critical in order to prevent seizure and complete locking of the partly formed tube on the mandrel.

The included angle between opposite side walls of the material gathering channel is determined by the number of fins to be produced at the interior of the tube. It is of course assumed that the fins are to have uniform angular spacing around the interior surface of the tube. On this assumption the opposite side walls of each material gathering channel are equally inclined with respect to a radial plane and have therebetween an included angle as nearly as possible equal to $360°/N$ where N is the number of fins. Furthermore, as indicated in the foregoing, the machining of these channels must be performed in parallelism with the axis of the mandrel.

Referring now to FIGURE 21 there are shown three pairs of material gathering channels and associated fin-forming grooves. It will be understood of course that this figure is purely diagrammatic and is presented for the purpose of graphically illustrating the necessary relationship between the side walls of the material gathering channels.

In this figure the mandrel as a whole is designated 70 and its longitudinal axis is indicated at 72. The pair of material gathering channels and grooves indicated by the bracket A represent the proper relationship to produce satisfactory operation in the practice of the internal fin formation described in the foregoing. The material gathering channels 74 have opposite equally inclined side walls 76, these walls having an imaginary inward extension to the point 78 at which point the included angle between the side walls 76 is measured. In the illustrated relationship the angular spacing between the center lines 80 of the pair of channels and grooves bracketed at A is 30 degrees. Accordingly, in the complete circumference of the mandrel twelve such channel and groove configurations would be provided. Accordingly, the correct included angle between the side walls 76 of the material gathering channels is determined by the formula $360°/N$, and since in this instance N is twelve, the appropriate included angle is 30 degrees.

Since the included angle between confronting side walls 76 is 30 degrees, and since these side walls are equally inclined with respect to the radial planes 80, it will be apparent that each side wall is inclined at an angle of 15 degrees with respect to the radial plane bisecting the groove and channel configuration. Since the angle between radial planes bisecting adjacent channel and groove configurations is 30 degrees it will be apparent that the side walls 76 of one material gathering channel is parallel to the adjacent side wall 76 of the next adjacent channel and groove configuration. This is the desirable relationship.

Referring to the groove and channel configurations designated by the bracket B, the groove and channel configurations here are illustrated as having the same 30 degrees angular separation but the material gathering channels 84 have side walls 86 inclined at an angle greater than the correct angle as illustrated in the construction bracketed at A. Due to the greater than correct included angle between side walls of each material gathering channel 84, it will be observed that the dimension Wa representing the transverse width of the material between adjacent channel and groove configurations bracketed at B, is less than the dimension Wb which is the transverse width of the material between adjacent channel and groove configurations bracketed at B at a point closer to the axis 72 of the mandrel. This of course means that as the outside diameter of the mandrel is tapered to correspond to the dimension Wb, the width of the material of the mandrel intermediate adjacent channel and groove configurations bracketed at B actually increases. This is further graphically illustrated by projecting the adjacent side walls 86 of adjacent channels 84 which converge outwardly and meet along the line whose trace is indicated by the point 88.

Conversely, if the configuration of the channel and groove configurations is as bracketed at C, the converse holds true. In this case the material gathering channels 94 have opposed confronting side walls 96, the included angle between which is less than the correct angle illustrated in the configuration bracketed at A. With this relationship adjacent side walls 96 of adjacent channels 94 converge inwardly and meet along the line whose trace is indicated at the point 98.

The criticality of the included angle between the inwardly converging side walls of each material gathering channel will be apparent from the following: In the first place, it will be recognized that the portion of the mandrel between adjacent material gathering channels can be considered as a longitudinally extending element designated in FIGURE 21 as 100. The top surface 102 of this element is of course crowned owing to the fact that the mandrel is of course a conical configuration having a a circular cross-section in any plane perpendicular to its axis. The two edges or corners 104 of the crowned longitudinal element will vary in width longitudinally of the mandrel due to the taper of the mandrel, unless the side walls 76 of the material gathering channels 94 are of such angularity as to cause the adjacent side walls of adjacent channels to occupy parallel planes. This is a condition illustrated in the channels 74 bracketed at A in FIGURE 21. The variation in width is of course controllable by selecting the correct included angle for the channel side walls in accordance with the formula $360°/N$ where N (an integer greater than 2) is the number of fins. Any angle smaller than the correct angle creates a condition in which the top surfaces of the crowned longitudinally extending elements 100 become narrower as they progress toward the smaller end of the mandrel, thus forming wedge-shaped longitudinal elements.

In this case the adjacent sides of any two adjacent material gathering channels will converge radially inwardly toward the axis of the mandrel, a condition which is illustrated in the channel-groove configuration bracketed at C. Thus, the part of the mandrel between the adjacent channels becomes dove-tailed in cross-section having a width at the outer surface greater than the width at points below the outer surface. This condition causes an interlocking action and prevents the tube from springing back from contact with the mandrel surface after the portion of the roll has passed over the tube and when the tube is in registration with the relief section 22 for the purpose of advancing the tube along the mandrel prior to its next rolling action.

The absence of spring-back eliminates the appearance of the small space between the surfaces of the mandrel (both the top crowned surface and the side surfaces of the longitudinally extending element 100) and the metal of the tube. This space is essentially to provide for lubrication of these surfaces by capillary action. Without this lubrication the tube seizes and locks on the mandrel and the operation breaks down.

Accordingly, if the included angle between opposite side walls of the material gathering channel is substantially less than $360°/N$ the operation fails.

If the included angle between the side walls of the material gathering channel is substantially greater than $360°/N$, as previously described, a condition is created whereby the width across the top of the crowned surface of the longitudinally extending element 100 increases as it progresses toward the smaller end of the mandrel, thus creating wedge-shaped longitudinal elements with the large end of the wedge toward the small end of the mandrel. This condition of course results from the fact that with a too large included angle, the transverse width of the longitudinally extending element 100 increases radially inwardly of the mandrel so that as the mandrel tapers the top surface of the longitudinally extending element increases in width toward the small end of the mandrel. This creates a situation in which these wedge-shaped elements prevent or oppose the metal of the tube and the fins being formed from being displaced along the mandrel, as is required in the operation. This applies to that part of the operation as illustrated in FIGURES 13, 15, 17 and 19 when the metal is being rolled. During this part of the cycle the metal is being displaced forwardly, parallel to the mandrel surfaces and not parallel to the mandrel axis. Due to the forward displacement of material in parallelism to the mandrel surfaces, the wedge shape of the longitudinally extending element 100 causes the material of the tube to seize and lock on the mandrel.

In addition, as lubrication of the mandrel and forming channels is dependent on lubricant carried on the inside of the tube, any increase in minimum included angle between the side walls of the material gathering channels decreases the width of the top surface of the crowned longitudinal element and correspondingly reduces the efficiency of lubrication.

As indicated above, departure from the correct angular spacing of opposite side walls of a material gathering channel causes failure of the operation. The reason for this failure is different if the included angle is too great as compared to the situation resulting from a too small included angle. While best results are obtained when the included angle between opposite side walls of the material gathering channels conforms to the formula $360°/N$, it will of course be appreciated that it is necessary only to maintain the required angularity within a few degrees.

The foregoing represents a theoretical explanation of why the included angle between the side walls of the material gathering channels is critical. The criticality of the included angle between these side walls has been amply demonstrated by exhaustive tests in which the inclination of the side walls of the material gathering channels have been inclined both to greater and lesser degrees than the correct inclination as determined by the formula for the included angle which is equal to $360°/N$ where N (an integer greater than 2) is the number of equally spaced channel and groove configurations provided on the mandrel.

The drawings and the foregoing specification constitute a description of the improved apparatus for producing longitudinal, internal, and integral fins in tubing, in such full, clear, concise and exact terms as to enable any person skilled in the art to practice the invention, the scope of which is indicated by the appended claims.

What I claim as my invention is:

1. A fin-forming tool comprising an elongated mandrel of generally circular cross-section, a plurality of circumferentially spaced axially extending elongated material gathering channels having radially outwardly diverging side walls, said channels being of decreasing cross-section from end to end, and fin-receiving grooves at the bottoms of said channels extending radially inwardly of said mandrel.

2. A fin-forming tool comprising a body provided with an elongated groove having substantially parallel side walls shaped to receive a fin as it is extruded into said groove and having an outwardly facing material gathering channel having side walls forming extensions of the side walls of said groove inclined outwardly of said groove and away from each other to define an inwardly narrowing material gathering channel in communication with said groove along its length, said channel being of decreasing depth from one end to the other.

3. In tube finning apparatus, a tapered mandrel having a plurality of fin receiving grooves having substantially parallel side walls extending axially thereof, the radially outer portions of said grooves including material gathering channels having outwardly diverging side walls forming continuations of the side walls of said grooves, said outwardly diverging channel side walls being formed in parallelism with the axis of said mandrel and disposed in position such that at the small end of the tapered mandrel, substantially all of the diverging side walls disappear.

4. Tube finning apparatus comprising a tapered mandrel having a plurality of fin receiving grooves extending axially thereof, the radially outer portions of said grooves including material gathering channels having outwardly diverging side walls forming continuations of the side walls of said grooves, said outwardly diverging channel side walls being formed in parallelism with the axis of said mandrel and disposed in position such that at the small end of the tapered mandrel, substantially all of the diverging side walls disappear, means for advancing a tube step by step over said mandrel, and opposed pairs of rolls for pressing the material of said tube radially inwardly against said mandrel between each successive advance thereof.

5. In tube finning apparatus, a tapered mandrel having a plurality of equally spaced fin receiving grooves extending axially thereof, the radially outer portions of said grooves including material gathering channels having outwardly diverging side walls forming continuations of the side walls of said grooves, said outwardly diverging channel side walls being formed in parallelism with the axis of said mandrel and disposed in position such that at the small end of the tapered mandrel, substantially all of the diverging side walls disappear, the included angle between said channel side walls being substantially equal to $360°/N$, where N is an integer greater than 2 and represents the number of equally spaced grooves provided in the mandrel.

6. Tube finning apparatus comprising a tapered mandrel having a plurality of fin receiving grooves extending axially thereof, the radially outer portions of said grooves including material gathering channels having outwardly diverging side walls forming continuations of the side walls of said grooves, said outwardly diverging channel side walls being formed in parallelism with the axis of said mandrel and disposed in position such that at the small end of the tapered mandrel, substantially all of the diverging side walls disappear, said channel side walls of each channel having an included angle of about $360°/N$, where N is an integer greater than 2 and represents the number of grooves in said mandrel, means for advancing a tube step by step over said mandrel, and opposed pairs of rolls for pressing the material of said tube radially inwardly against said mandrel between each successive advance thereof.

7. A fin-forming tool comprising a body provided with a plurality of elongated grooves each having substantially parallel side walls shaped to receive a fin as it is extruded into said groove and each having an outwardly facing material gathering channel having side walls forming extensions of the side walls of said groove inclined outwardly of said groove and away from each other to define an inwardly narrowing material gathering channel in communication with said groove along its length, said channel being of decreasing depth from one end to the other, the side walls of said channels defining included angles of approximately $360°/N$ where N is an integer greater than 2 and represents the number of grooves in the tool.

8. In tube finning apparatus, a tapered mandrel having a plurality of fin-receiving grooves extending axially thereof, the radially outer portions of said grooves including material gathering channels having outwardly diverging side walls forming continuations of the side walls of said grooves, said outwardly diverging channel side walls being formed in parallelism with the axis of said mandrel and disposed in position such that at the small end of the tapered mandrel, the diverging side walls substantially disappear, the included angle between said channel side walls being approximately $360°/N$ where N is an integer greater than 2 and represents the number of fin-forming channels in said mandrel.

No references cited.